No. 890,843. PATENTED JUNE 16, 1908.
M. R. COLE.
CULTIVATOR.
APPLICATION FILED MAY 4, 1907.
2 SHEETS—SHEET 1.
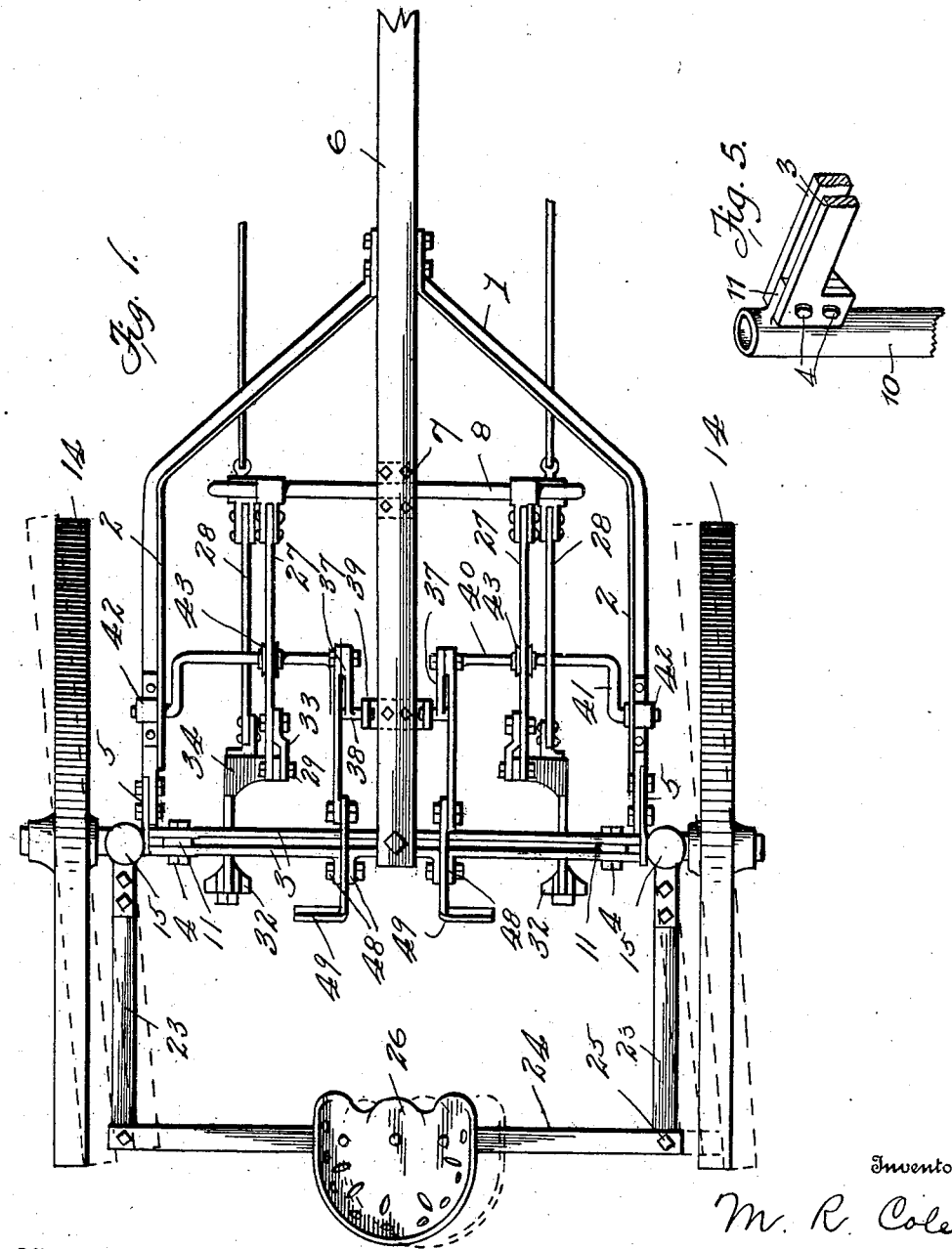

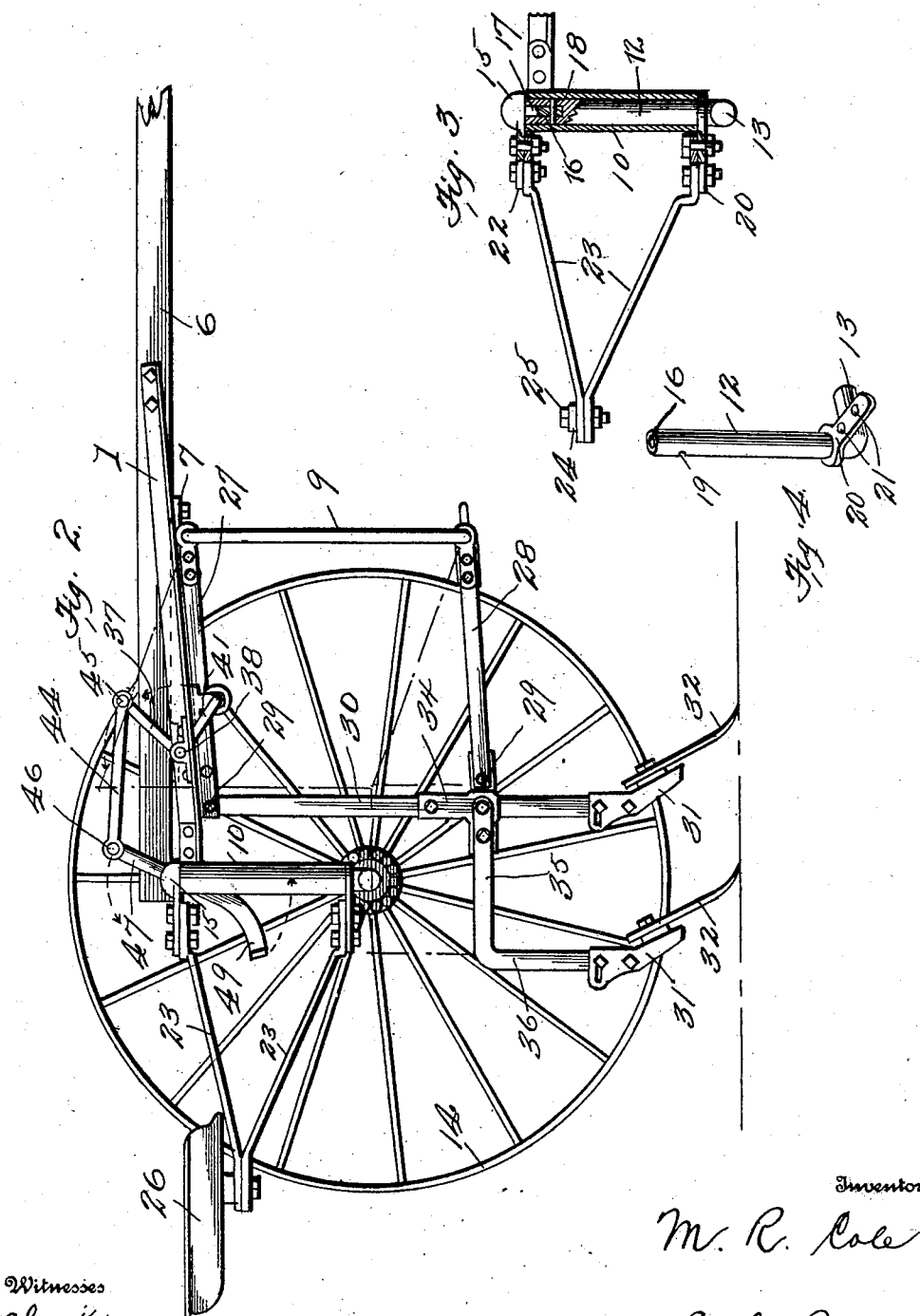

UNITED STATES PATENT OFFICE.

MELVILLE R. COLE, OF SHENANDOAH, IOWA, ASSIGNOR OF ONE-HALF TO EARL R. FERGUSON, OF SHENANDOAH, IOWA.

CULTIVATOR.

No. 890,843.  Specification of Letters Patent.  Patented June 16, 1908.

Application filed May 4, 1907. Serial No. 371,911.

*To all whom it may concern:*

Be it known that I, MELVILLE R. COLE, a citizen of the United States, residing at Shenandoah, in the county of Page and State of Iowa, have invented certain new and useful Improvements in Cultivators, of which the following is a specification.

This invention relates to new and useful improvements in cultivators and has particular reference to a cultivator including a wheeled frame and riding attachment.

In connection with a cultivator of the above type, the invention aims as a primary object to provide novel means for raising and lowering the cultivator teeth at the option of the operator.

The invention aims as a further object to provide novel means for shifting the wheels to avoid obstacles or rough ground in their path of travel.

The detailed construction will appear in the course of the following description in which reference is had to the accompanying drawings forming a part of this specification, like characters of reference designating similar parts throughout the several views, wherein, Figure 1 is a top plan view of a cultivator constructed in accordance with my invention. Fig. 2 is a side elevation thereof. Fig. 3 is a detailed elevation with parts in section of the wheel mounting and guiding means. Fig. 4 is a detailed perspective view of an element shown in Fig. 3 and to be hereinafter specifically referred to, and Fig. 5 is an enlarged perspective view, partly broken away, of parts to be hereinafter specifically referred to.

In the practical embodiment of my invention I employ a supporting frame 1, comprising side bars 2 and a rear portion comprising parallel bars 3 united at their ends by coupling bolts 4, and having fixed connection with said side bars by means of straps 5. Centrally of the frame 1 is a forwardly extending tongue 6, from which depends a stationary arch shaped member connected thereto as at 7, and comprising a horizontal top bar 8 and depending side arms 9, the arms 9 being shown in Fig. 2. This arch shaped member co-acts with the frame 1 to afford a support for the various adjustable operating elements of the device.

Adjacent the ends of the parallel bars 3 are arranged bearing sleeves 10 having slotted angular lugs 11 extending therefrom between the ends of said bars 3 and locked therein to hold said sleeves, by means of the coupling bolts 4 passing through the slots thereof. Adjacent the sleeves 10 are mounted L shaped axles having vertical portions 12 loosely disposed within said sleeve and having a short length horizontal portion 13 constituting the axle *per se*, and upon which the wheels 14 are mounted. Cap members 15 are imposed upon the upper ends of the sleeves 10 and have fixed connection with the vertical portions 12, a preferred embodiment of such connection being shown in Fig. 3. The vertical portions 12 at their upper ends are formed with axial recesses 16 and the cap members 15 are formed with pins 17 projecting into said recesses. A cotter pin 18 passes transversely through the portion 12 and through the pin 17 and serves to afford fixed connection between the cap members 15 and said portions 12, the latter being apertured as at 19 to receive the pins 18. Adjacent the axles 13, the portions 12 are provided with horizontal rearwardly projecting arms 20 which may be fixed or integral and which are provided with apertures 21. The cap members 15 are provided with similar arms 22, arranged directly above, and coincident with the arms 21.

A rear seat frame is provided which comprises converging bars 23 arranged on each side of the apparatus and having their front ends fixed to the arms 20 and 22. The bars 23 bear against one another at their rear ends and support a rear cross bar 24 which has pivotal connection with the rear ends of the bars 23 by a bolt and nut fastening 25 passing through each end of the bar 24 and through the adjacent rear end of the bars 23. The driver's seat 26 is supported upon the bar 24.

Means for supporting the cultivator teeth comprises a frame embodying pivotally connected members which compensate one another as it were, in their adjustable movement. Such frames are arranged on each side of the tongue 6 and comprise upper beams 27 and lower beams 28 pivotally connected with the arch shaped member adjacent the upper and lower ends of the arms 9. The beams 27 and 28 are pivotally connected at their ends as at 29 with the vertical standard 30 upon which are adjustably carried the shovel shanks 31 having the shovels 32. Adjacent the pivot 29 of the beam 27 a strengthening strap 33 is provided as is shown in Fig. 1. The standards 30 are provided adjacent the beams 28 with fixed brackets 34 to which are connected L shaped standards 35, having a depending leg 36 upon which is carried shovel shanks 31 similar to those above mentioned and having shovels 32. The shovel frame thus described is supported by means of the arch shaped member and by bell cranks 37, pivoted at the junction of their legs as at 38 in brackets 39 carried by the tongue 6. At their lower ends the levers 37 are provided with crank shafts 40 which have one end pivotally connected with said levers and which have their other end extending rearwardly at an angle as at 41 and pivoted in brackets provided upon the side bars 2 as at 42. Pulleys 43 are provided upon the shafts 40 and engage the beams 27 to co-act with the arch shaped member in supporting the same and the parts associated therewith. Links 44 have their ends pivoted as at 45 to the ends of the bell crank levers 37 and as at 46 to the upper ends of foot levers 47, the latter being in turn pivoted between lugs 48 provided upon the rearmost end bar 3. The levers 48 at their lower ends are provided with angular foot pieces 49.

In practical use when the operator reaches the end of a row the shovels 32 are lifted from the ground by pressing upon the foot pieces 49 in the direction of the arrow Fig. 2. This action moves the bell crank lever 37 to raise the beams 27 and 28 and the standards 30 and 35 to the dotted line position. When the levers 47 are released the parts drop by gravity to their normal positions. Assuming that an obstacle is in the path of the wheels 14, the latter may be swung to either side, as is shown in dotted lines Fig. 1, by the movement of the seat frame which is accomplished by pressing with the foot upon some stationary part, so that the seat frame, owing to the pivotal connection of its elements, swings in the desired direction, its movement being transmitted to the wheels 14, by reason of the connection described.

While the elements herein shown and described are well adapted to serve the functions set forth, it is obvious that various minor changes may be made in the proportions, shape and arrangement of the several parts without departing from the spirit and scope of the invention as defined in the appended claims.

Having fully described my invention I claim:

1. A cultivator of the character described, comprising a stationary frame, shovels carried thereby, vertical sleeve bearings rigidly carried by said frame, axles having vertical portions journaled in said sleeve bearings, wheels mounted on said axles, and a movable rear seat frame rigidly secured to said vertical portions of said axle above and below said sleeve bearings and adapted to control the guiding of said wheels by its movement with relation to said stationary frame, substantially as described.

2. A cultivator of the character described, comprising a stationary frame, shovels carried thereby, vertical sleeve bearings rigidly carried by said frame axles having vertical portions journaled in said sleeve bearings, wheels mounted on said axles, and a movable seat frame comprising converging bars arranged at each side of said stationary frame and a rear seat bar pivotally connected at its end to the adjoining ends of said converging bars, the spaced ends of said converging bars being rigidly secured to said axles above and below said sleeve bearings, said movable seat frame being adapted to control the guiding of said wheels by its movement with relation to said stationary frame, as described.

3. In a cultivator of the character described, a main frame comprising transverse bars carrying wheel bearings, side bars converging at their forward ends, a central tongue secured upon said transverse bars and between said converging ends of said bars and extending forwardly thereof, an arch shaped member secured below said tongue and extending from both sides thereof within said frame, adjustable shovel frames pivotally mounted on said arch shaped member on both sides of said tongue, crank shafts journaled between said tongue and said side bars on both sides of said tongue, foot levers pivotally mounted on said transverse bars and having pivotal connection with said crank shafts for independently rocking the same, and a seat frame mounted rearwardly of said main frame, substantially as described.

In testimony whereof I affix my signature in presence of two witnesses.

MELVILLE R. COLE.

Witnesses:
EARL R. FERGUSON,
BURNET FERGUSON.